US010847144B1

(12) United States Patent
Tellefsen et al.

(10) Patent No.: US 10,847,144 B1
(45) Date of Patent: *Nov. 24, 2020

(54) METHODS AND APPARATUS FOR IDENTIFICATION AND ANALYSIS OF TEMPORALLY DIFFERING CORPORA

(71) Applicant: NetBase Solutions, Inc., Santa Clara, CA (US)

(72) Inventors: Jens Erik Tellefsen, Mountain View, CA (US); Ranjeet Singh Bhatia, Sunnyvale, CA (US)

(73) Assignee: NetBase Solutions, Inc., Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/855,165

(22) Filed: Sep. 15, 2015

Related U.S. Application Data

(63) Continuation of application No. 13/836,416, filed on Mar. 15, 2013, now Pat. No. 9,135,243.

(51) Int. Cl.
*G10L 15/19* (2013.01)
*G06Q 30/02* (2012.01)
(Continued)

(52) U.S. Cl.
CPC .............. *G10L 15/19* (2013.01); *G06F 16/26* (2019.01); *G06F 16/9535* (2019.01); *G06Q 30/0201* (2013.01); *G06Q 50/01* (2013.01)

(58) Field of Classification Search
CPC ............................. G10L 15/187; G10L 15/19
See application file for complete search history.

(56) References Cited

U.S. PATENT DOCUMENTS 5,694,523 A 12/1997 Wical
5,940,821 A 8/1999 Wical
(Continued)

OTHER PUBLICATIONS

Gautam et al., published Feb. 17, 2008 (y/m/d), pp. 2040-2042. "Document Retrieval Based on Key Information of Sentence," IEEE ICACT.

(Continued)

*Primary Examiner* — Douglas Godbold
(74) *Attorney, Agent, or Firm* — Kaplan IP Law, PLLC; Jonathan T. Kaplan

(57) ABSTRACT

Differences are identified, at the lexical unit and/or phrase level, between time-varying corpora. A corpus for a time period of interest is compared with a reference corpus. N-grams are generated for both the corpus of interest and reference corpus. Numbers of occurrences are counted. An average number of occurrences, for each n-gram of the reference corpus, is determined. A difference value, between number of occurrences in corpus of interest and average number of occurrences, is determined. Each difference value is normalized. N-grams can be selected for display, or for further processing, on the basis of the normalized difference value. Further processing can include selecting a sample period. A plurality of reference corpora are produced, where a begin time, for each sub-corpus of the plurality of reference corpora, differs, from a begin time for the corpus of interest, by an integer multiple of the sample period. Word Cloud visualization is shown.

20 Claims, 9 Drawing Sheets

(51) Int. Cl.
*G06Q 50/00* (2012.01)
*G06F 16/26* (2019.01)
*G06F 16/9535* (2019.01)

(56) References Cited

U.S. PATENT DOCUMENTS

| | | | |
|---|---|---|---|
| 5,963,940 | A | 10/1999 | Liddy et al. |
| 5,995,922 | A | 11/1999 | Penteroudakis et al. |
| 6,202,064 | B1 | 3/2001 | Julliard |
| 6,675,159 | B1 | 1/2004 | Lin et al. |
| 6,965,857 | B1 | 11/2005 | Decary |
| 7,302,383 | B2 | 11/2007 | Valles |
| 7,305,336 | B2 | 12/2007 | Polanyi et al. |
| 7,356,540 | B2 | 4/2008 | Smith et al. |
| 7,496,593 | B2 | 2/2009 | Gardner et al. |
| 7,779,007 | B2 | 8/2010 | West et al. |
| 7,805,302 | B2 | 9/2010 | Chelba et al. |
| 8,046,348 | B1 | 10/2011 | Rehling et al. |
| 8,055,608 | B1 | 11/2011 | Rehling et al. |
| 8,301,436 | B2 * | 10/2012 | Wang ............... G10L 15/1822 704/231 |
| 8,935,152 | B1 | 1/2015 | Li et al. |
| 9,047,285 | B1 | 6/2015 | Li et al. |
| 2002/0091671 | A1 | 7/2002 | Prokoph |
| 2003/0083863 | A1 * | 5/2003 | Ringger ............. G06F 17/277 704/10 |
| 2003/0172061 | A1 | 9/2003 | Krupin et al. |
| 2003/0216905 | A1 | 11/2003 | Chelba et al. |
| 2004/0044952 | A1 | 3/2004 | Jiang et al. |
| 2004/0078190 | A1 | 4/2004 | Fass et al. |
| 2004/0150644 | A1 | 8/2004 | Kincaid |
| 2005/0149494 | A1 | 7/2005 | Lindh et al. |
| 2005/0165600 | A1 | 7/2005 | Kasravi et al. |
| 2007/0156677 | A1 | 7/2007 | Szabo |
| 2009/0112892 | A1 | 4/2009 | Cardie et al. |
| 2009/0306967 | A1 | 12/2009 | Nicolov et al. |
| 2011/0161071 | A1 * | 6/2011 | Duong-van ........ G06F 17/2785 704/9 |
| 2011/0224971 | A1 * | 9/2011 | Moore ............... G06F 17/271 704/9 |
| 2013/0018651 | A1 * | 1/2013 | Djordjevic ........... G06Q 10/00 704/9 |

OTHER PUBLICATIONS

Ku et al., published Mar. 27, 2006 (y-m-d), 8 pgs. "Opinion Extraction, Summarization and Tracking in News and Blog Corpora," AAAI Spring Symposium Series 2006.

Manning et al., published 1999. "Foundations of Statistical Natural Language Processing," The MIT Press, Table of Contents (12 pgs), sec. 8.5.1 (pp. 296-303) & sec. 15.2 (pp. 539-544). ISBN 0-262-13360-1.

Ruppenhofer et al., published Aug. 25, 2006 (y/m/d), 166 pages. "FrameNet II: Extended Theory and Practice," International Computer Science Institute, University of California at Berkeley, USA.

Wu, Tianhaow et al., published May 3, 2003 (y/m/d), 12 pgs. "A Supervised Learning Algorithm for Information Extraction From Textual Data," Proceedings of the Workshop on Text Mining, Third SIAM International Conference on Data Mining.

Zadrozny, Slawomir et al., published 2003, 5 pgs. "Linguistically quantified thresholding strategies for text categonzation," Systems Research Institute, Polish Academy of Sciences, Warszawa, Poland.

Zhang et al., published Jun. 22, 2010 (y/m/d), 10 pgs. "Voice of the Customers: Mining Online Customer Reviews for Product Feature-based Ranking," Proceedings of the 3rd Wonference on Online social networks (WOSN '10). USENIX Association, Berkeley, CA, USA.

Lucene Support p. 2454, with comments dated May 10, 2010-Jul. 16, 2010; https://issues.apache.org/jira/browse/LUCENE-2454; retrieved Jul. 24, 2019 (y/m/d); 9 pages.

Lucene Slide Share Presentation, dated May 7, 2010; https://www.slideshare.net/MarkHarwood/proposal-for-nested-document-support-in-lucene; retrieved Jul, 24, 2019 (y/m/d); 15 pages.

readme.txt in LuceneNestedDocumentSupport.zip, creation date May 10, 2010; retrieved Jul. 25, 2019 (y/m/d); 2 pages.

NestedDocumentQuery.java in LuceneNestedDocumentSupport.zip, creation date Aug. 25, 2010; retrieved Jul. 25, 2019 (y/m/d); 8 pages.

PerParentLimitedQuery.java in LuceneNestedDocumentSupport.zip, creation date Sep. 8, 2010; retrieved Jul. 25, 2019 (y/m/d); 10 pages.

* cited by examiner

FIGURE 2A

FastEats_ngrams$_{TPI}$:

| n-gram "ng" | ng_no$_{TPI}$ |
|---|---|
| ⋮ | |
| lunch | 103 |
| dinner | 27 |
| salmonella | 8 |
| ⋮ | |

FastEats_ngrams$_{REF}$:

| n-gram "ng" | ng_no$_{REF}$ |
|---|---|
| ⋮ | |
| lunch | 1200 |
| dinner | 600 |
| salmonella | 15 |
| ⋮ | |

FIGURE 2B

FastEats_ngrams$_{FA}$:

| n-gram "ng" | ng_no$_{REF}$ | ng_no$_{TPI}$ |
|---|---|---|
| ⋮ | | |
| lunch | 1200 | 103 |
| dinner | 600 | 27 |
| salmonella | 15 | 8 |
| ⋮ | | |

FIGURE 2C

FastEats_ngrams$_{FA}$:

| n-gram "ng" | ng_no$_{REF}$ | ng_no$_{TPI}$ | ng_avg$_{REF}$ | ng_diff |
|---|---|---|---|---|
| ⋮ | | | | |
| lunch | 1200 | 103 | 50 | 53 |
| dinner | 600 | 27 | 25 | 2 |
| salmonella | 15 | 8 | 0.625 | 7.375 |
| ⋮ | | | | |

FIGURE 2D

FastEats_ngrams$_{FA}$:

| n-gram "ng" | ng_no$_{REF}$ | ng_no$_{TPI}$ | ng_avg$_{REF}$ | ng_diff | ng_dn % |
|---|---|---|---|---|---|
| ⋮ | | | | | |
| lunch | 1200 | 103 | 50 | 53 | 106 |
| dinner | 600 | 27 | 25 | 2 | 8 |
| salmonella | 15 | 8 | 0.625 | 7.375 | 1180 |
| ⋮ | | | | | |

FIGURE 2E

Stage 1: FastEats_ngrams$_{FA}$:

| n-gram "ng" | ng_no$_{REF}$ | ng_no$_{TPI}$ | ng_avg$_{REF}$ | ng_diff | ng_dn % |
|---|---|---|---|---|---|
| ⋮ | | | | | |
| salmonella | 15 | 8 | 0.625 | 7.375 | 1180 |
| lunch | 1200 | 103 | 50 | 53 | 106 |
| dinner | 600 | 27 | 25 | 2 | 8 |
| ⋮ | | | | | |

FIGURE 2F

Periodic Analysis of FastEats_ngrams$_{FA}$:

| n-gram "ng" | ng_no$_{REF}$ | ng_avg_s$_{REF}$ | ng_diff_s | ng_dn_s % | ng_dn_s std dev |
|---|---|---|---|---|---|
| ⋮ | | | | | |
| salmonella | 1, 0, 1, 1, 0 | 0.6 | 7.4 | 1233 | 15.1 |
| dinner | 23, 25, 30, 27, 20 | 25 | 2.0 | 8 | 0.59 |
| lunch | 95, 105, 111, 101, 98 | 102 | 1.0 | 1.0 | 0.18 |
| ⋮ | | | | | |

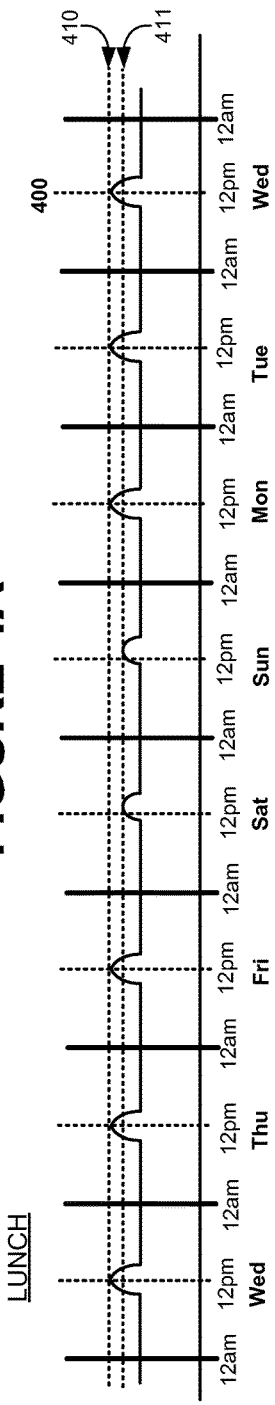
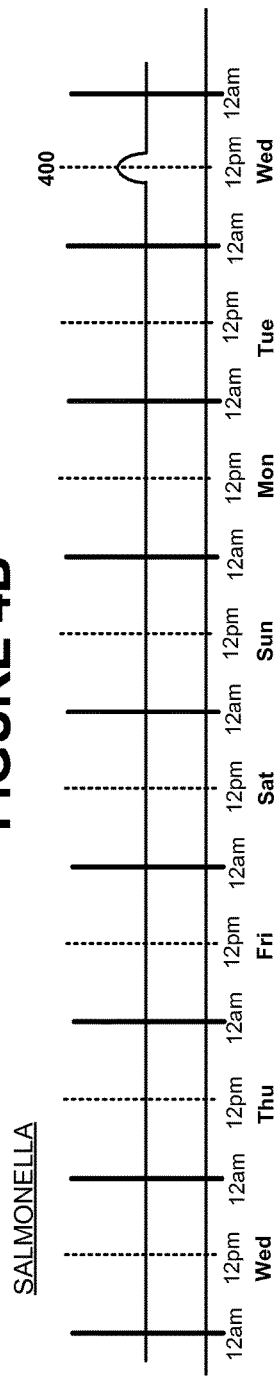
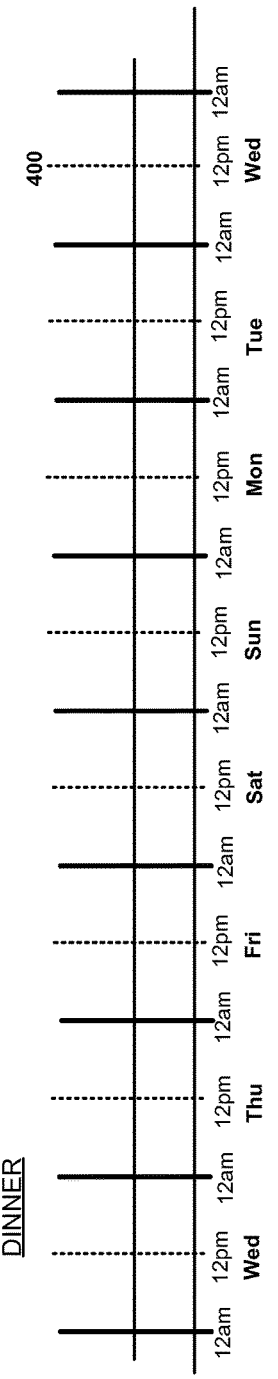
FIGURE 4A
FIGURE 4B
FIGURE 4C

EXAMPLE PRODUCTION ENVIRONMENT

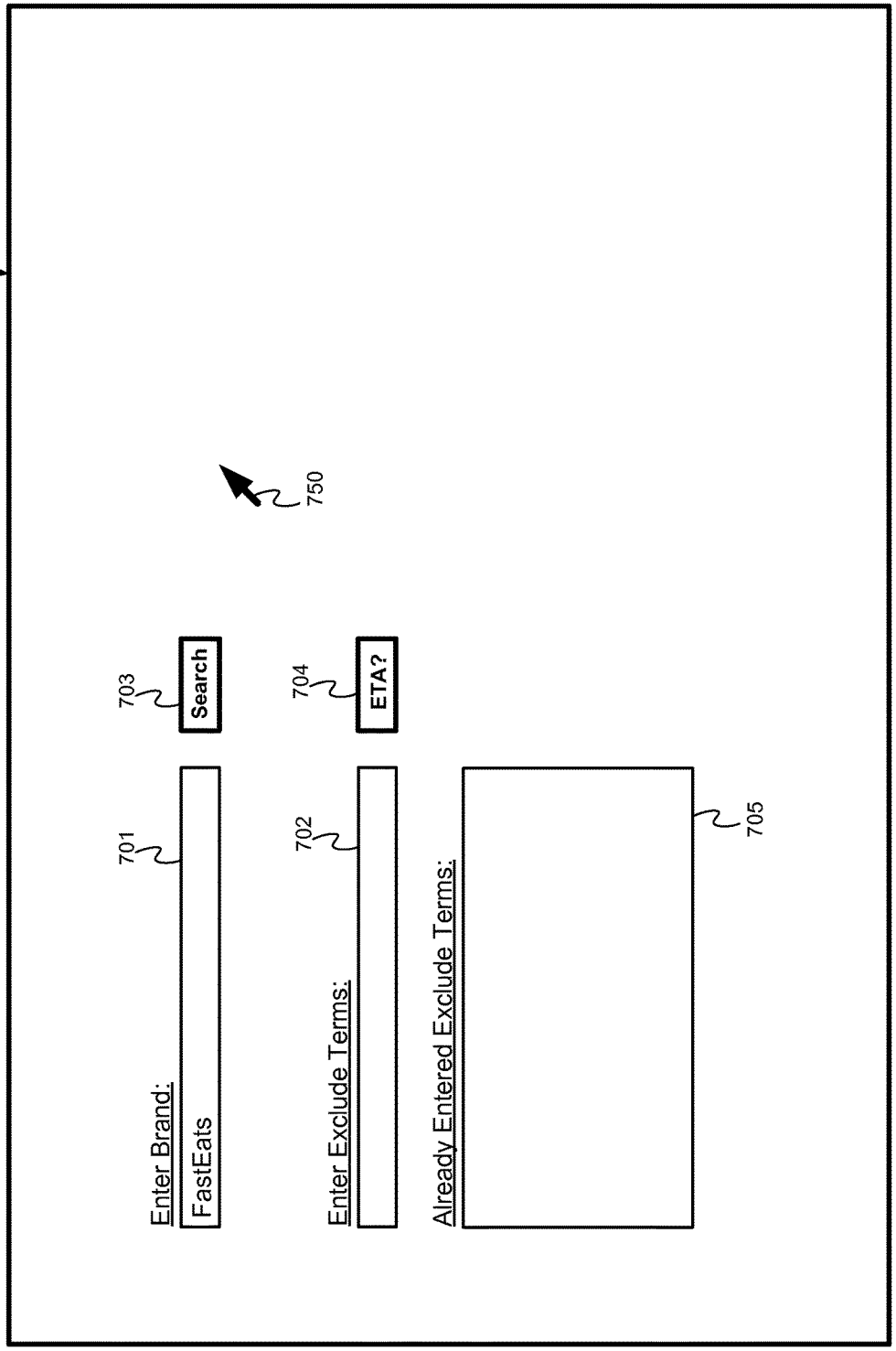

METHODS AND APPARATUS FOR IDENTIFICATION AND ANALYSIS OF TEMPORALLY DIFFERING CORPORA

As provided for under 35 U.S.C. §120, this patent claims benefit of the filing date of the following U.S. patent application, herein incorporated by reference in its entirety:

"Methods and Apparatus for Identification and Analysis of Temporally Differing Corpora," filed 2013 Mar. 15 (y/m/d), having inventors Jens Erik Tellefsen, and Ranjeet Singh Bhatia, and application Ser. No. 13/836,416.

CROSS REFERENCE TO RELATED APPLICATIONS

This application is related to the following U.S. patent application(s), which are herein incorporated by reference in their entirety:

"Graphical Representation of Frame Instances and Co-occurrences," filed 2012 Nov. 13 (y/m/d), having inventor(s) Michael Jacob Osofsky application. Ser. No. 13/676,073 ("the '073 Application"); and "Methods and Apparatuses For Sentiment Analysis," filed 2012 May 14 (y/m/d), having inventors Lisa Joy Rosner, Jens Erik Tellefsen, Michael Jacob Osofsky, Jonathan Spier, Ranjeet Singh Bhatia, Malcolm Arthur De Leo, and Karl Long and application. Ser. No. 13/471,417 ("the '417 Application");

"Methods and Apparatuses for Clustered Storage of Information and Query Formulation," filed 2011 Oct. 24 (y/m/d), having inventors Mark Edward Bowles, Jens Erik Tellefsen, and Ranjeet Singh Bhatia and application. Ser. No. 13/280,294 ("the '294 Application"); and "Method and Apparatus for HealthCare Search," filed 2010 May 30 (y/m/d), having inventors Jens Erik Tellefsen, Michael Jacob Osofsky, and Wei Li and application. Ser. No. 12/790,837 ("the '837 Application").

Collectively, the above-listed related applications can be referred to herein as "the Related Applications."

FIELD OF THE INVENTION

The present invention relates generally to the identification and analysis of differences between corpora, and more particularly to identification and analysis between corpora representing differing time intervals.

BACKGROUND OF THE INVENTION

It is well known that tracking customer satisfaction is an important technique for sustained competitive advantage.

More recently customers are using online tools to express their opinions about a wide range of products and services. Many such online tools can be described as being under the general category of "Social Media" (or SM). Online tools in this category include, but are not limited to, the following:

FACEBOOK, Inc. (Menlo Park, Calif., U.S.A.)
TWITTER, Inc. (San Francisco, Calif., U.S.A.)
all variety of "web logs" or "blogs"
all variety of "Web 2.0" sites, that facilitate feedback from a site's audience or readers The availability of such SM content raises the question of whether, with appropriate technology, tools can be applied to identify and analyze changes in consumer opinion over time, as expressed in such data.

BRIEF DESCRIPTION OF THE DRAWINGS

The accompanying drawings, that are incorporated in and constitute a part of this specification, illustrate several embodiments of the invention and, together with the description, serve to explain the principles of the invention:

FIGS. 2A-2E represent successive stages, in a Stage 1 analysis, at a lexical unit and/or phrase level, of social-media-derived consumer opinion data.

FIG. 2F represents Periodic Analysis, as applied to a Stage 1 analysis.

FIGS. 4A-4C each represent volumes of social media data over the course of one week, as it relates to an n-gram appearing in connection with a brand.

FIG. 7 shows an example User Interface (or UI) for entering a consumer sentiment search.

DETAILED DESCRIPTION OF PREFERRED EMBODIMENTS

Figure 1A:
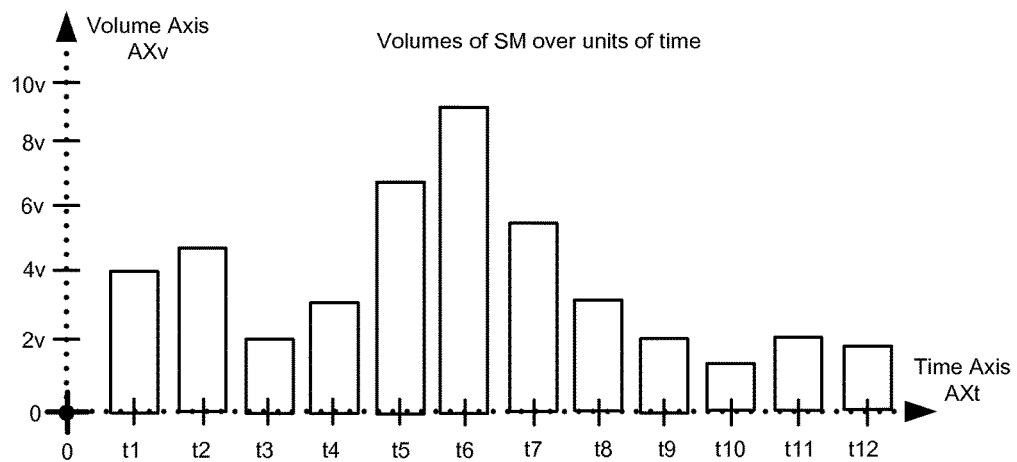
FIGS. 1A-1C represent changes in the volume of social-media-derived consumer opinion data, over time, as it relates to a particular brand.

Reference will now be made in detail to various embodiments of the invention, examples of which are illustrated in the accompanying drawings. Wherever possible, the same reference numbers will be used throughout the drawings to refer to the same or like parts.

In addition to being incorporated by reference in their entirety, the description presented herein specifically relies on many sections of the Related Applications. Please refer to Section 3.1 ("Referring to Related Applications") for an explanation of a systematic notation for reference to them.

Please refer to Section 4 ("Glossary of Selected Terms") for the definition of selected terms used below.

TABLE OF CONTENTS TO DETAILED DESCRIPTION

1 Brand Tracking and Analysis
2 Temporal Analysis
  2.1 Introduction
  2.2 Finding Lexical Units and/or Phrases
  2.3 Visualization
  2.4 Periodic Analysis
3 Additional Information
  3.1 Referring To Related Applications
  3.2 Additional Calculations
  3.3 Frame-Based Search Engines (or FBSE's)
  3.4 Computing Environment
4 Glossary of Selected Terms

1 BRAND TRACKING AND ANALYSIS

An example area of application, within which the present invention can be utilized, is the performance, by a brand manager, of brand tracking and analysis. A brand manager is defined herein as a person responsible for the continued success of a brand. Focused upon herein, as an example area of applicability, are branded products and/or services sold to consumers, also referred to herein as "consumer brands." A brand manager needs to monitor consumer interest in, and sentiment toward, each consumer brand that constitutes an area of his or her responsibility.

A type of search to accomplish this, described in Section 2.1 of the '294 Application ("Consumer Sentiment Search"), is called a "consumer sentiment search." The '294 Application describes the searching of a database that includes the collection, in a large scale and comprehensive way, of postings (such as "tweets" on Twitter) to social media (or SM) web sites or services. This type of social media inclusive database is referred to as an "SM_db," and its basic elements are called documents (even though, in social media, an individual posting may be quite short). To create a suitably fast search tool, the '294 Application describes comprehensive pre-query scanning of the documents in an SM_db.

A consumer sentiment search is predicated upon an ability to identify, within an SM_db, the instances in which the particular brand of interest is being mentioned. Techniques for accomplishing this are addressed, in detail, in the '294 and '417 Applications. The '417 Application refers to this as producing an object-specific corpus, where the example "object" selected-for is a brand. Techniques presented, for production of an object-specific corpus, include an ability to recognize instances of frames, as well as an ability to utilize "exclude terms," used for ruling out appearances of lexical units used for meanings other than identification of the brand.

In the '294 Application, similar sentiments towards a brand are grouped together, so that the user can see a list summarizing the kinds of sentiments expressed along with an indication of the frequency with which each sentiment occurred. While this type of the summarization does provide a relatively detailed analysis of consumer sentiment, at a lexical unit and/or phrase level, it provides no specific tools for understanding how such consumer sentiment can change over time.

The '417 Application presents further techniques (e.g., Section 1.3, "Sentiment Analysis"), by which the results of a consumer sentiment search can be analyzed. An embodiment is presented where the sentiment of each statement is evaluated along at least one, or both, of the following two (relatively independent) dimensions:
- polarity (i.e., a two-value categorization, of whether an expression of sentiment is generally "positive" or "negative") and
- intensity (i.e., a two-value categorization, of whether an expression of sentiment is generally "strong" or "weak").

Metrics are presented for summarizing, in an aggregate (or net) way, a population of statements that have been evaluated according to at least one of these two dimensions. A metric for each of polarity and intensity are presented. They are referred to as, respectively:
- "Net Polarity Metric" or NPM
- "Net Intensity Metric" or NIM Section 1.5 of the '417 Application ("Temporal Dimension") discusses the fact that a temporal dimension can be added to the analysis of a consumer sentiment search. Sentiment analysis can be applied to a time-series of corpora (also referred to herein as a corpora time-series), each collected in essentially the same way, except for the following: each corpus of the time-series represents data that is linked to a different (and often successive) time interval. For example, in the case of an SM_db, each corpus of a corpora time-series can represent those items of social media posted (e.g., TWITTER Tweets posted) during the time interval represented by the corpus.

A tool for monitoring the volume of social media about a particular brand, that we shall also refer to herein as a "Volume Monitor," can be useful to a brand manager. FIG. 1A presents a display of this kind. A similar kind of bar graph was introduced in the '417 Application, Section 1.5 ("Temporal Dimension"), with respect to a FIG. 8A.

To provide an example for further discussion below, it is assumed there is a brand manager (sometimes referred to herein as "bm_1"), with responsibility for a (fictitious) brand of fast-food eating establishments called "FastEats." FIG. 1A represents a corpora time-series as a bar graph, where each bar represents a volume of social media posts during a particular time period. Each unit of the horizontal axis (i.e., time axis "AXt") represents a unit of time "t." For each unit of time "t," the vertical axis (i.e., volume axis "AXv") represents the volume (or number) of statements posted. The unit of time can be any unit useful to the brand manager, including, but not limited to, the following standard units: minute, hour, day, week, or month. The time unit can also be a multiple of a standard time unit (e.g., each time unit could represents three days).

Regarding the vertical volume axis, while AXv is shown as divided into 10 units, the actual volume represented by each unit can be set at any appropriate level by choosing a suitable value for scaling factor "v."

2 TEMPORAL ANALYSIS

2.1 Introduction

Figure 1B:
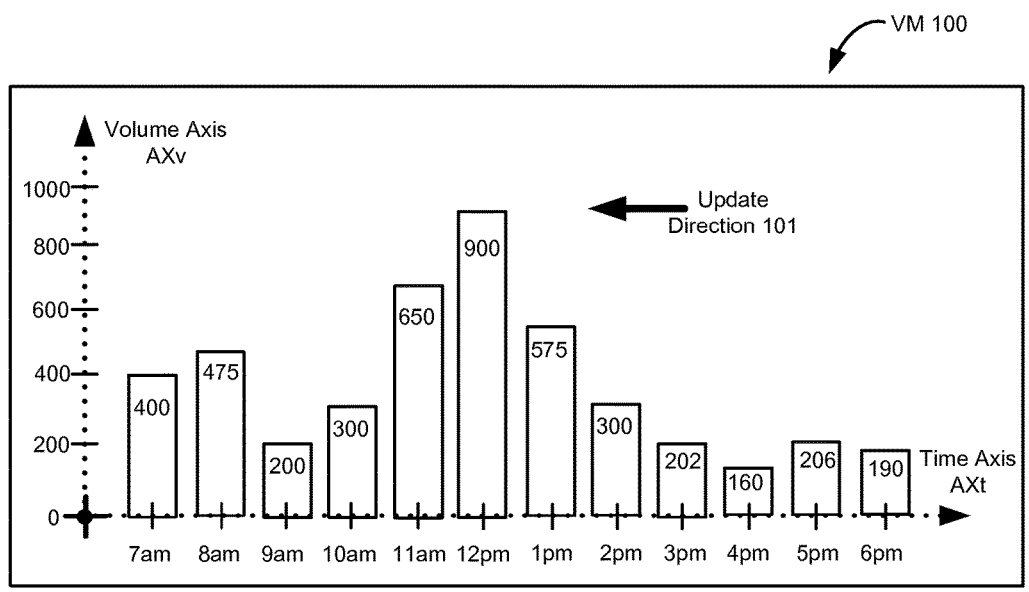

FIG. 1B shows the bar graph of FIG. 1A re-presented as a particular kind of Volume Monitor display labeled VM 100. All volumes shown in FIG. 1B relate to FastEats. The time unit has been set at one hour, and the volume scaling factor chosen is 100. Thus, a volume of posts-per-hour from 0 to 1000 can be shown. Each bar is defined to represent the hour ending at the time indicated below it. For example, the leftmost bar, labeled "7 am," represents those posts (about the brand FastEats) that occurred over the time range 6:01 AM to 7:00 AM. From left to right, a total of 12 bars are shown, each representing a successive hour, the rightmost bar representing the time range 5:01 PM to 6:00 PM.

For purposes of example, it is assumed that FastEats specializes in providing breakfast and lunchtime foods, with lunchtime being the more important of the two. As can be seen in FIG. 1B, the volume of social media about FastEats is relatively low during the hours ending at 9:00 AM and 10:00 AM, that are in-between the typical times for breakfast and lunch. These in-between hours have post volumes of, respectively, 200 and 300, for an average post volume of 250. For the hours ending at 7 AM and 8 AM, when breakfast is more likely to be a topic of conversation, the post volumes are, respectively, 400 and 475, for an average post volume of 437.5. During the hours ending at 11 AM and 12 PM, when lunch is likely to be a conversation topic, social media volume peaks. These two hours have post volumes of, respectively, 650 and 900, for an average post volume of 775.

While a Volume Monitor, like that of FIG. 1B, can provide extremely useful information, a brand manager may wish to understand, at a lexical unit and/or phrase level, why changes in volume are occurring. In terms of the example for the brand FastEats, two main use scenarios, for brand manager bm_1, are discussed:

1. Use Scenario 1: bm_1, upon observing a time-dependent display, such as the Volume Monitor of FIG. 1B, identifies a particular time segment that is of interest. This time segment is referred to as the Time Period of Interest (TPI). A TPI may be of interest because, for example, it represents, with respect to adjacent time periods, a discontinuity (e.g., a sudden "jump up," or a sudden "drop off") in the volume of social media posts about the brand (e.g., FastEats). bm_1 is interested in "drilling down," to find out what people were saying during the TPI and how that discussion differs from adjacent time periods.

2. Use Scenario 2: bm_1's TPI is of a predetermined duration, but it has a begin time that is periodically updated, in order to maintain a fixed relationship to a present time. For example, bm_1 may wish to have a display, updated each hour, indicating what new things people have said about her/his brand of responsibility. Newness can be found by comparing, to the most-recently completed hour of data, at least several prior hours.

Regarding Use Scenario 1, let's suppose, with respect to the Volume Monitor of FIG. 1B, that the Time Period of Interest (TPI) has a duration of one hour and it is the hour ending at 11:00 AM (equivalently, it can be described as the hour with a begin time of 10:01 AM). While this hour (or TPI) could be compared with any selection of hours, occurring before and/or after the TPI, the below discussion will focus on comparing the TPI to the 24 hours that preceded it.

Regarding Use Scenario 2, we will assume a situation that is the same as is described above, with regard to Use Scenario 1, except that:
 The begin time of the TPI is that of the most recent complete hour of posts added to SM_db.
 Each hour the TPI is updated.

Figure 1C:
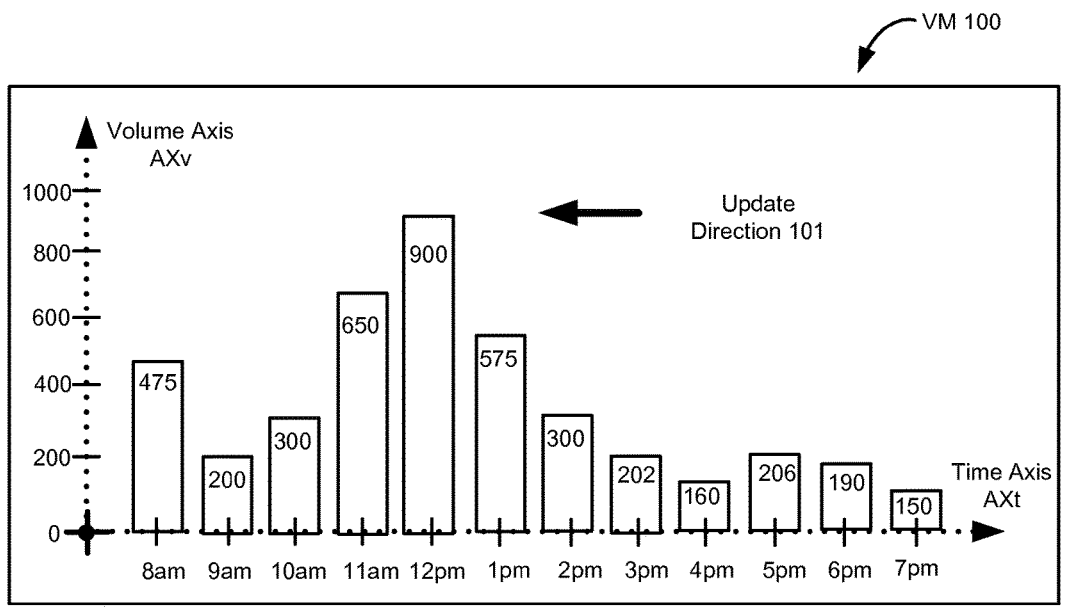

Under Use Scenario 2, the TPI is always the rightmost hour of Volume Monitor 100. In FIG. 1B, it is the hour 5:01 PM-6:00 PM. The corpus for that hour is compared with a corpus of the 24 hours that preceded it. It would be expected that a "current time," at which bm_1 can be viewing display VM 100 (of FIG. 1B), is from 6:01 PM to 7:00 PM. At 7:01 PM, the display can be updated, with all bars shifting leftward, indicated in FIG. 1B as Update Direction 101. After the shift, display VM 100 can appear as shown in FIG. 1C. The leftmost bar of FIG. 1B has disappeared, while on the right side of the display there is a new rightmost bar labeled "7 pm," to represent the hour from 6:01 PM to 7:00 PM. Once again, "what's new," in the rightmost bar of FIG. 1C, can be determined by comparing it with a corpus of the 24 hours that preceded it.

While the use of a Volume Monitor is used herein as an example context in which a brand manager may wish to utilize the present invention, it should be noted that Section 1.5 of the '417 Application also discusses a similar display for monitoring, over time, variation of the Net Polarity or Net Intensity Metrics. FIG. 8B (of the '417 Application) is the same as FIG. 8A, except each corpus of the time series is subjected to a same categorization. FIG. 8B represents such categorization by dividing each bar (or rectangle) of the bar graph, at a time "t," into cross-hatched and clear regions. FIG. 8C (of the '417 Application) shows the plotting of a Net Polarity Metric value, at each time "t," from the data of FIG. 8B. More generally, a graph like FIG. 8C can be referred to as a Polarity Monitor.

While the above-described Volume and Polarity Monitors can be of great value to a brand manager, they are limited to representing aggregate or net changes between corpora. The present invention focuses upon identifying differences at the lexical unit and/or phrase level, between time-varying corpora.

For purposes of presenting the example of FastEats, in greater detail, the following SM_db, called SM_db_1, is defined:
 SM_db_1 contains social media (or SM) posts over a 1 year period, starting from a "current" or "now" time (with respect to a particular session of use by a particular user) and going back 1 year.
 SM_db_1 can be updated on a per-minute basis. However, it should be understood that any other suitable time period (e.g., hour, day, week, etc.) can be used. In the case of per-minute updates, at any time t_now, SM_db_1 comprises:
 One year of posts, accessible down to a per-minute level of temporal granularity.
 SM_db_1 contains a corpus of posts for both a most-recent minute (i.e., the last complete minute to occur, just prior to t_now) and a corpus of posts for an oldest minute (i.e., the minute occurring one year prior to the most-recent minute).
 Each time SM_db_1 is updated:
 The corpus corresponding to the oldest minute is deleted from SM_db_1 and the corpus corresponding to the next-to oldest minute becomes the corpus of oldest minute.
 The corpus for the most-recent minute becomes the corpus for a next-to most-recent minute, and a corpus for the new most-recent minute is added.

As has been discussed, in the '294 and '417 Applications, an SM_db like SM_db_1 can comprise hierarchically-organized clusters of records, each cluster structured as follows:
1. SentenceObj: Primary purpose is to represent focus sentence of snippet.
 Permits searching, by focus sentence content, at indexed field "FocusSentence."
 Permits searching, by snippet that includes the focus sentence, at indexed field "Snippet."
 1.1. InstanceObj: Represents an instance, for each frame found in focus sentence. Permits searching, by frame type, at indexed field "FrameType."
 1.1.1. RoleObj: Represents the roles, for each instance. Permits searching, by role value content, at indexed field "Value."

To SentenceObj can be added another field, called (for example) "PostTime," indexed according to the time at which each SentenceObj is posted. Thus, a suitably encoded representation of a time interval can be input to the index of PostTime, resulting in a retrieval of those SentenceObj's that occurred during the specified time interval.

Using appropriate queries of SM_db_1, an object-specific corpus can be produced. For purposes of the example, appropriate queries can be used to identify those statements discussing the FastEats brand and this object-specific corpus can be referred to herein as SM_db_FastEats. FIG. 7 depicts an example user interface 700, by which queries to identify FastEats can be entered. FIG. 7 shows a search box 701 by which lexical units, that can identify the brand, can be entered. In box 702 can be entered "exclude terms": terms to be excluded from the search results. Assistance with finding exclude terms can be obtained from an "Exclude Term Assistant" (ETA), activated by clicking button 704 with mouse pointer 750. Already entered exclude terms are shown in box 705. A search can be initiated by clicking button 703 with mouse pointer 750.

Given the above-described SM_db_1 and SM_db_FastEats, a temporal analysis, at the lexical unit or phrase level, can be accomplished as follows. Section 2.2 below describes what is also called a "Stage 1" analysis. Section 2.3 discusses ways to visualize such Stage 1 results. Section 2.4 discusses a further analysis, that can be applied to the Stage 1 result, called Periodic Analysis.

2.2 Finding Lexical Units and/or Phrases

From the object-specific corpus of data (e.g., SM_db_FastEats), upon which the analysis is to be based, can be derived two main parts:

1. A corpus that only includes data related to the user's Time Period of Interest (TPI). Symbolically and generically, this corpus can also be referred to as: $corpus_{TPI}$.
2. A corpus that serves as a reference, against which $corpus_{TPI}$ can be measured. Symbolically, and generically, this corpus can be referred to as: $corpus_{REF}$. $corpus_{REF}$ can cover any period of time, so long as it is different from the TPI (so that $corpus_{REF}$ provides a differing set of data, against which $corpus_{TPI}$ can be compared). Often, $corpus_{REF}$ is selected to cover a period of time equal to an integer multiple of the time period covered by $corpus_{TPI}$. Stated more mathematically, the period of time covered by $corpus_{REF}$ is often=i*TPI, where i is an integer ≥2. In this case, where the time duration covered by $corpus_{REF}$ is an integer multiple of the duration of time covered by $corpus_{TPI}$, there are at least two choices for the form of $corpus_{REF}$:

$corpus_{REF}$ can be a single corpus covering a time period of duration i*TPI.

or $corpus_{REF}$ can comprise i corpora, each covering a time duration equal to TPI. When comprised of i corpora, the corpora can be referred to as follows: $corpus_{REF(1)}$, $corpus_{REF(2)}$, . . . $corpus_{REF(i)}$.

In accordance with Use Scenario 1, it is assumed bm_1 wishes to "drill down" into the reasons why the volume of social media posts, about FastEats, rises to a total of 650 during the hour of 10:01 AM-11:00. These 650 posts can comprise the above-described $corpus_{TPI}$, and can be referred to as $SM\_db\_FastEats_{TPI}$. A corpus such as SM_db_FastEats$_{TPI}$ can be produced from SM_db_FastEats, for example, by applying appropriate queries to the above-described PostTime index. The posts occurring in the preceding 24 hours comprise the above-described $corpus_{REF}$, and can be referred to as $SM\_db\_FastEats_{REF}$. With regard to FIG. 1B, only the first four hours preceding the TPI are shown (i.e., the hours ending at 7 AM, 8 AM, 9 AM, and 10 AM). For purposes of presenting the example, however, it is not necessary to know the total volume of posts during this preceding 24 hour period. Post totals are only needed on a per-lexical unit or per-phrase basis.

The brand manager's interest in the hour of 10:01 AM-11:00 can also apply to Use Scenario 2, by simply assuming that this hour is the most recent hour for which complete data is available. As each additional hour of information is available, the analysis described below, for the hour of 10:01 AM-11:00, is repeated (but with the beginning of the applicable time periods shifting forward by one hour).

Using any suitable algorithm known in the art, the n-grams of $corpus_{REF}$ and $corpus_{TPI}$ can be determined. Typically, when determining the n-grams, n is in the following range: 1≤n≤4. An ordered list of the n-grams for $corpus_{TPI}$ and $corpus_{REF}$ can be referred to, respectively, as $ngrams_{TPI}$ and $ngrams_{REF}$. For each of these ordered lists, along with each of its n-grams "ng," is included the number of times the n-gram occurs in its corpus. For an n-gram ng, this number of times can be referred to as ng_no. For an n-gram ng of $ngrams_{TPI}$, its ng_no can be referred to as $ng\_no_{TPI}$. For an n-gram ng of $ngrams_{REF}$, its ng_no can be referred to as $ng\_no_{REF}$.

For purposes of the example, the ordered lists $ngrams_{TPI}$ and $ngrams_{REF}$ can be referred to as, respectively, $FastEats\_ngrams_{TPI}$ and $FastEats\_ngrams_{REF}$. FIG. 2A depicts a small fragment of each of $FastEats\_ngrams_{TPI}$ and $FastEats\_ngrams_{REF}$. (The possibility of FIG. 2A representing only a fragment of each table shown is indicated by the ellipses, at the top and bottom of each table. Such ellipses are also included in the tables of FIGS. 2B-2F.) Specifically, FIG. 2A depicts two tables:

1. A table for $FastEats\_ngrams_{TPI}$. This table shows only three n-grams, "*salmonella*," "lunch," and "dinner." For each of these n-gram's, its $ng\_no_{TPI}$ is, respectively, 8, 103, and 27.
2. A table for $FastEats\_ngrams_{REF}$. This table shows the same three n-grams of $FastEats\_ngrams_{TPI}$. For each of these n-gram's, its $ng\_no_{REF}$ is, respectively, 15, 1200, and 600.

From these two tables, we know the following about, for example, the term "*salmonella*":

During the hour of interest (10:01 AM to 11:00 AM) it occurred a total of 8 times.

During the 24 hours preceding the hour of interest, it occurred a total of 15 times.

Next, an ordered list of n-grams for further analysis is defined. This ordered list of n-grams can be referred to herein as $ngrams_{FA}$. The n-grams for $ngrams_{FA}$ are chosen from among the n-grams of $ngrams_{TPI}$ and $ngrams_{REF}$. Example possibilities, for n-grams to include in $ngrams_{FA}$, comprise (but are not limited to) the following:

$ngrams_{TPI}$ $ngrams_{REF}$ $ngrams_{TPI}$ U $ngrams_{REF}$ (where U Is just like the union operator for sets, except it is being applied to ordered lists and the result is an ordered list)

For purposes of the example, $ngrams_{FA}$ can be referred to as $FastEats\_ngrams_{FA}$. FIG. 2B shows an example table for $FastEats\_ngrams_{FA}$, formed by taking the union of the tables of FIG. 2A.

Because the number of n-grams in $ngrams_{FA}$ can be extremely large, it can be important to reduce its size. A heuristic, for decreasing the size of $ngrams_{FA}$, is to keep only those n-grams having above a certain threshold number of occurrences. Another approach is to list the n-grams of $ngrams_{FA}$ in order of a decreasing number of occurrences. The number of occurrences used for this ordering can be based upon $ng\_no_{TPI}$, $ng\_no_{REF}$, or ($ng\_no_{TPI}$+$ng\_no_{REF}$). Only a predetermined number of n-grams, when starting from the beginning of $ngrams_{FA}$ and proceeding in order of a decreasing number of occurrences, can be kept for further processing. For purposes of the example $FastEats\_ngrams_{FA}$, it may be appropriate to keep only the first 500 n-grams for further processing. For purposes of further processing of the example, it will be assumed that the three n-grams of FIG. 2B are in the top 500, and that the table of FIG. 2B remains unchanged.

From the above-described data for an $ngrams_{FA}$, the following additional data can be determined for, and also stored with, each n-gram "ng":

$ng\_avg_{REF}$: Over the time duration represented by $corpus_{REF}$, determine the average number of occurrences of ng. This can be determined by determining a multiple "m" that has the following property: m multiplied by the duration of the TPI equals the duration represented by $corpus_{REF}$. $ng\_avg_{REF}$ can then be determined as follows:

$$ng\_no_{REF}/m$$

ng_diff: Determine the difference between the number of occurrences of ng during the time period of interest ($ng\_no_{TPI}$) and the average rate at which ng occurs during the reference time period ($ng\_avg_{REF}$). This difference can be determined as follows: $ng\_no_{TPI}$-$ng\_avg_{REF}$, that results in a positive difference when $ng\_no_{TPI}$ is above average and a negative difference when $ng\_no_{TPI}$ is below average.

FIG. 2C shows a table that is the same as FIG. 2B, except $ng\_avg_{REF}$ and ng_diff have been included. For example, for the term "salmonella," it can be seen that 15/24=0.625, and 8−0.625=7.375. FIG. 2C shows us that, for the hour of interest, the number of posts involving the term "salmonella" differs by 7.375 from the average number of posts during the preceding 24 hours. Similarly, FIG. 2C also shows us that, for the hour of interest, the number of posts involving the term "lunch" differs by 53 from the average number of posts during the preceding 24 hours. While 53 is certainly larger than 7.375, this does not necessarily indicate that the term "lunch" should be of greater interest to the brand manager than term "salmonella."

To enhance the ability to meaningfully compare different ng_diff values, as calculated for different n-grams, the differences can be normalized using any appropriate technique. Normalization can be accomplished by dividing each ng_diff value by either of the two values from which it is calculated:

1. $ng\_diff/ng\_no_{TPI}$ or
2. $ng\_diff/ng\_avg_{REF}$

Regardless of how it is calculated, each normalized ng_diff can be referred to as ng_dn, and each can be stored with its n-gram in $ngrams_{F4}$. It can also be useful to express ng_dn as a percentage, obtained by multiplying ng_dn by 100. For the example, FIG. 2D is the same as FIG. 2C, except that the FIG. 2D has added a column for ng_dn as a percentage (ng_dn %). Of the above-described normalization methods, the data of FIG. 2D is produced by:

$$ng\_diff/ng\_avg_{REF}$$

Another possibility for achieving normalization, if the $corpus_{REF}$ for an n-gram ng is comprised of i corpora, is to determine the standard deviation across such corpora. This can be accomplished as follows. For each of $corpus_{REF(1)}$, $corpus_{REF(2)}$, ... $corpus_{REF(i)}$, the number of occurrences of n-gram ng can be determined. Respectively, each of these number-of-occurrences values can be represented as follows: $ng\_no_{REF(1)}$, $ng\_no_{REF(2)}$, ... $ng\_no_{REF(i)}$. The standard deviation of these i values can be calculated using any standard procedure, with the result represented by ng_sd. Normalization can then be calculated as follows:

$$ng\_diff/ng\_sd$$

While, with regard to absolute difference values, the term "lunch" seems much more significant than the term "salmonella," when normalization is applied, the term "salmonella" is seen to be undergoing a much larger change, with respect to posting activity of the recent past. Specifically, while "lunch" has a normalized difference value of 106%, "salmonella" has a value of 1180%.

When normalization is produced by dividing by $ng\_avg_{REF}$, a normalized difference value of about 100% indicates that the change in posting activity, for the TPI, is about the same size as total average posting activity has been in the past. Viewed in this way, a brand manager may still regard "lunch" as having shown an important change in activity during the TPI, even though the activity change is not as large as that for "salmonella." In contrast, the term "dinner," with an activity change of only 8%, may be regarded as having no significant activity change.

At this point, it can be useful to reduce the size of $ngrams_{F4}$, either for purposes of displaying results to the user or for further processing. As was described above, as options for reducing the size of the initial $ngrams_{F4}$, heuristics can again be applied. Either or both of the same heuristics can be used, the difference being that an n-gram is kept or removed on the basis of its normalized difference value, rather than its number of occurrences:

Remove those n-grams that do not satisfy a threshold value for ng_dn.
and/or
Put the n-grams in order of decreasing ng_dn. Only select a predetermined number of n-grams, when starting at the top of $ngrams_{F4}$, and descending (according to ng_dn value). For purposes of the example FastEats-$ngrams_{F4}$, it may be appropriate to select (for example) only a first "f" n-grams, where f is in the range 2≤f≤20. FIG. 2E is the same as FIG. 2D, except the n-grams are listed in order of decreasing ng_dn. All three n-grams shown in FIG. 2D are assumed to be within the top "f" n-grams and therefore appear in FIG. 2E.

With this second heuristic reduction of $ngrams_{F4}$, a first major stage of temporal analysis, for identifying lexical units and/or phrases of interest, has been accomplished. In many cases, a "Stage 1" level of analysis may be all that is needed.

2.3 Visualization

Once a Stage 1 level of analysis has been completed, its results can be visualized, to the user, using any appropriate techniques.

An example approach is to use the "Word Cloud" visualization technique. Two example approaches to using a Word Cloud are described herein, each approach illustrated with the data of FIG. 2E.

Figure 3A:
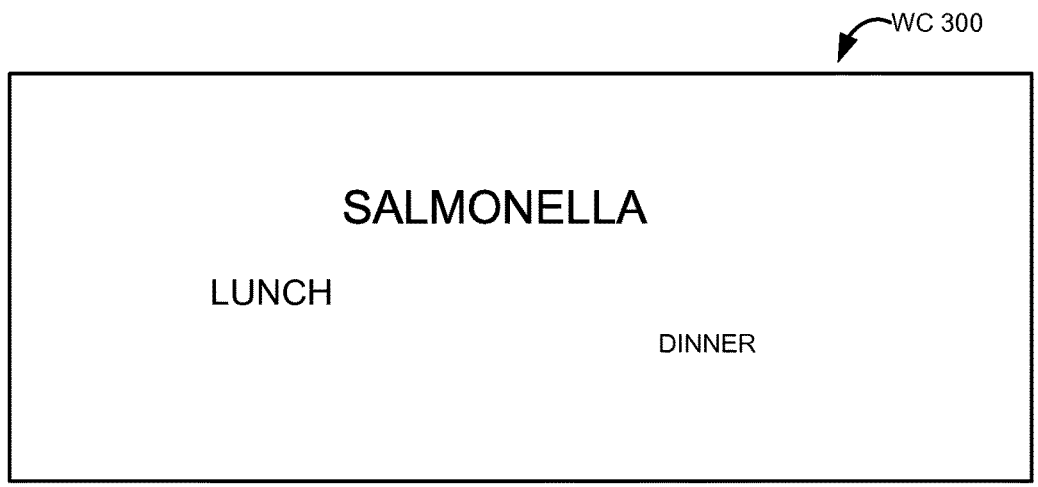
FIGS. 3A-3B represent Word Cloud visualizations, of the results of a Stage 1 analysis.

The first approach is shown in FIG. 3A. In general, it can be described as having the following steps:

1. Select a font size, for each n-gram ng of $ngrams_{F4}$, that varies in relation to its normalized difference value ng_dn. Since the value for ng_dn can vary quite widely (e.g., from "dinner" to "salmonella" ng_dn varies by about two orders of magnitude), font size can be selected in proportion to the log of ng_dn (where the logarithm used can be of any appropriate base, such as 2 or 10). For values of ng_dn that are below a certain threshold, a certain minimum-size font can be imposed.
2. Display the n-grams using any appropriate positioning technique.

Figure 3B:
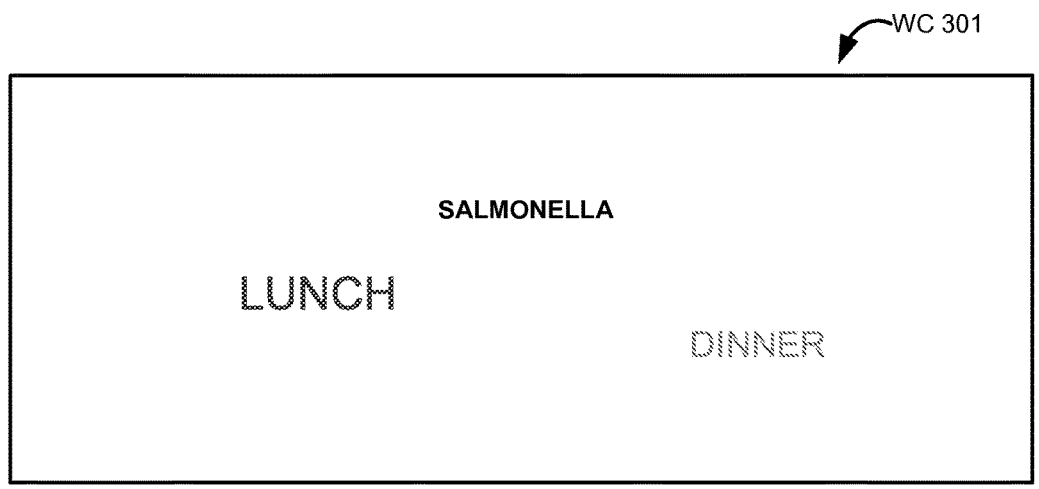

A second approach, to using a Word Cloud, is shown in FIG. 3B. In general, it can be described as having the following steps:

1. Select a font size, for each n-gram ng of $ngrams_{F4}$, that varies in relation to its number of occurrences (or ng_no). The number of occurrences utilized can be based upon the TPI (i.e., $ng\_no_{TPI}$), the reference time period (i.e., $ng\_no_{REF}$), or a combination of both. Since the value for ng_no can vary quite widely (e.g., from "salmonella" to "lunch" $ng\_no_{TPI}$ varies by about an order of magnitude), font size can be selected in proportion to the log of ng_no (where the logarithm used can be of any appropriate base, such as 2 or 10).

For values of ng_no that are below a certain threshold, a certain minimum-size font can be imposed.

2. Select a font transparency, for each n-gram ng of ngrams$_{F4}$, that varies in relation to its ng_dn. Since the value for ng_dn can vary quite widely (e.g., from "dinner" to "salmonella" ng_dn varies by about two orders of magnitude), font transparency can be selected in portion to the log of ng_dn (where the logarithm used can be of any appropriate base, such as 2 or 10). For values of ng_dn that are below a certain threshold, a certain minimum-transparency font can be imposed.

3. Display the n-grams using any appropriate positioning technique.

In FIG. 3A "salmonella" is in the largest font size, because it has the largest normalized difference value (i.e., ng_dn). In contrast, in FIG. 3B, "salmonella" is in the smallest font size, because, in relation to "dinner" and "lunch," it has the lowest number of occurrences. However, in FIG. 3B, "salmonella" is in the darkest (or least transparent) font, because it has the largest normalized difference value (i.e., ng_dn).

Of course, the use of a Word Cloud is only an example, and any suitable graphical technique can be used, so long as it can be made to vary in either (or both) of the following two ways:

1. A graphical dimension or characteristic is made to vary in relation to the normalized difference value of each n-gram (possibly made to vary in relation to the log of the normalized difference value).

2. A first graphical dimension or characteristic is made to vary in relation to the normalized difference value of each n-gram (possibly made to vary in relation to the log of the normalized difference value). A second graphical dimension or characteristic is made to vary in relation to the number of occurrences of each n-gram (possibly made to vary in relation to the log of the number of occurrences).

2.4 Periodic Analysis

Periodic Analysis is an additional stage of processing, beyond above-described Stage 1 (see Section 2.2 "Finding Lexical Units and/or Phrases"). The purpose of Periodic Analysis is to filter out n-grams identified by Stage 1 as being of potential interest.

For example, Stage 1 processing on the example brand of FastEats, identified, within the TPI of 10:01 AM-11:00 AM, the n-gram "lunch" as being of potential interest to the brand manager. However, since we know that FastEats focuses mainly on the lunchtime market, it should not be surprising that the term "lunch" is discussed with much greater volume near lunchtime.

Periodic Analysis asks a deeper question: is there a periodic component to the variability of the TPI, and can we compare the TPI to similar portions of other cycles? Once the component of the TPI's change that is only periodic is filtered out, the user can obtain a much more accurate understanding of the extent to which the particular TPI is really unusual.

With regard to the TPI of 10:01 AM-11:00 AM, Periodic Analysis asks: how does this hour-of-interest compare with the same hour on other days? Let us further suppose that the TPI, of the FastEats example, occurs on a Wednesday. There are at least two possibilities, in terms of comparing this same hour to other hours:

1. Choose reference hours, for comparison to the TPI, solely on the basis of whether it has a begin time that differs, from the begin time of the hour-of-interest, by an integer multiple of 24 hours. Thus, a reference hour will always be at the same time of day as the TPI, but the days themselves can be chosen in an arbitrary manner. For example, the TPI could be compared with the same hour on the five preceding days: Fri, Sat, Sun, Mon, Tue. A problem with this type of selection, however, is that the type and level of "lunch" discussions may be characteristically different, between a business day and a weekend day.

2. Choose reference hours, for comparison to the TPI, on the basis of whether it has a begin time that differs, from the begin time of the hour-of-interest, by an integer multiple of (7*24) hours. Thus, a reference hour will not only be at the same time of day as the TPI, but on the same day of the week. For the particular example, this means that the TPI will only be compared to the same hour on other Wednesdays. Thus, in this case, there are two levels of periodicity: periodic with respect to a 24 hour day, and periodic with respect to a 7 day week.

The particular period or periods to apply, when performing a sampling of other times to assemble a reference corpus (i.e., the time-series corpora of corpus$_{REF(1)}$, corpus$_{REF(2)}$, . . . corpus$_{REF(i)}$) to compare with corpus$_{TPI}$, will depend on the particular application area. For a brand that specializes in providing fast weekday lunches, 24 hour and 7 day periods can be applicable.

This is illustrated in FIGS. 4A-4C, each of which represents, respectively, the n-grams "lunch," "salmonella," and "dinner." The diagrams of FIGS. 4A-4C are simplified, in order to emphasize the phenomenon of periodicity for n-grams. Each of FIGS. 4A-4C depicts a same 7 day period, starting with a Wed of one week and ending with the Wed (called Wed 400) of the following week. Each of FIGS. 4A-4C depicts the volume of posts during the same week, with respect to its n-gram and the brand FastEats.

FIG. 4A shows that, for each day, there is a periodic jump in activity, around lunchtime, for the n-gram "lunch." Amplitude lines 410 and 411 show that, respectively, there a greater volume of lunchtime discussion on business days than on weekends. Further, the lunchtime discussion on weekends is shifted towards occurring at a later time, since peak discussion occurs after the noon hour.

FIG. 4B shows that the jump in lunchtime activity for "salmonella" is really quite unique. Clearly, this is a term that a brand manager will want to know about.

FIG. 4C shows that, in general, there is never much discussion of "dinner" in connection with the FastEats brand.

Let us assume that, upon sampling the same hour of 10:01 AM-11:00 AM, on the five Wednesdays that preceded the TPI, the following data is collected for the n-gram "lunch" with respect to the brand FastEats:

95, 105, 111, 101, 98

An average for this data, that can be referred to as ng_avg_s$_{REF}$ (where an "s" is added, to the ng_avg$_{REF}$ discussed above for Stage 1, to indicate that this average is produced from sampled data), is determined:

$$ng\_avg\_s_{REF}=102$$

From ng_no$_{TPI}$ can be subtracted ng_avg_s$_{REF}$, to produce a non-normalized difference value:

$$ng\_diff\_s=103-102=1$$

Dividing this ng_diff_s by ng_avg_s$_{REF}$ (or ng_no$_{TPI}$), and multiplying by 100, to determine a normalized difference value as a % (called ng_dn_s %), shows a dramatic change from the ng_dn % determined in Stage 1:

Stage 1 result: ng_dn %≈100%
Periodic Analysis: ng_dn_s %≈1%
Alternatively, the standard deviation (called ng_sd_s) can be determined from the sampled data:

| # occur "lunch" at 11 am for different Wed | ng_avg_$s_{REF}$ | # occur − ng_avg_$s_{REF}$ | ( # occur − ng_avg_$s_{REF}$)$^2$ |
|---|---|---|---|
| 95  | 102 | −7 | 49 |
| 105 | 102 | 3  | 9  |
| 111 | 102 | 9  | 81 |
| 101 | 102 | −1 | 1  |
| 98  | 102 | −4 | 16 |
|     |     |    | 156 |

$$ng\_sd\_s = \sqrt{156/5} = 5.6$$

Dividing ng_diff_s by ng_sd_s produces the following value for ng_dn_s:

$$1/5.6 = 0.18$$

Even if the ng_dn_s (as produced from the standard deviation) were approximately equal to 1 (ng_dn_s≈1), this would still indicate that the number of occurrences for "lunch," within the TPI, is within a standard deviation of this value and is probably of no interest to the brand manager. However, the fact that the ng_dn_s is relatively close to zero emphasizes that, in fact, the number of occurrences of "lunch," for the TPI, is almost certainly of no interest.

Similar calculations, for n-grams "*salmonella*" and "dinner," are shown in Section 3.2 below ("Additional Calculations"). The results of Periodic Analysis, for all 3 n-grams, are summarized in FIG. 2F.

As can be seen, the biggest change, from the Stage 1 analysis of FIG. 2E, is the two-orders-of-magnitude drop in the normalized difference value for "lunch." The n-gram "*salmonella*" retains its status of being extremely significant. As can be seen, compared with the standard deviation for "*salmonella*," the change in the volume of discussion for this term, for the TPI, is over 15 times greater. The n-gram "dinner" retains its status of being relatively unimportant. The normalized difference value as a percentage remains the same (8%). The normalized difference value produced with the standard deviation for "dinner" is <1, indicating that the difference in volume for "dinner," for the TPI, is not unusual.

Regardless of how ng_dn_s is determined, that same heuristics described above, for reducing the size of ngrams$_{FA}$ at the end of Stage 1, can be utilized, if necessary, to reduce the number of n-grams presented to the user:
Remove those n-grams that do not satisfy a threshold value for ng_dn_s.
and/or
Put the n-grams in order of decreasing ng_dn_s. Only select a predetermined number of n-grams, when starting at the top of ngrams$_{FA}$, and descending (according to ng_dn_s value). For purposes of the example FastEats_ngrams$_{FA}$, it may be appropriate to select only a first "f" n-grams, where f is in the range 1≤f≤4.

FIG. 2F shows the n-grams of FIG. 2E re-ordered, according to decreasing ng_dn_s.

Figure 5A:
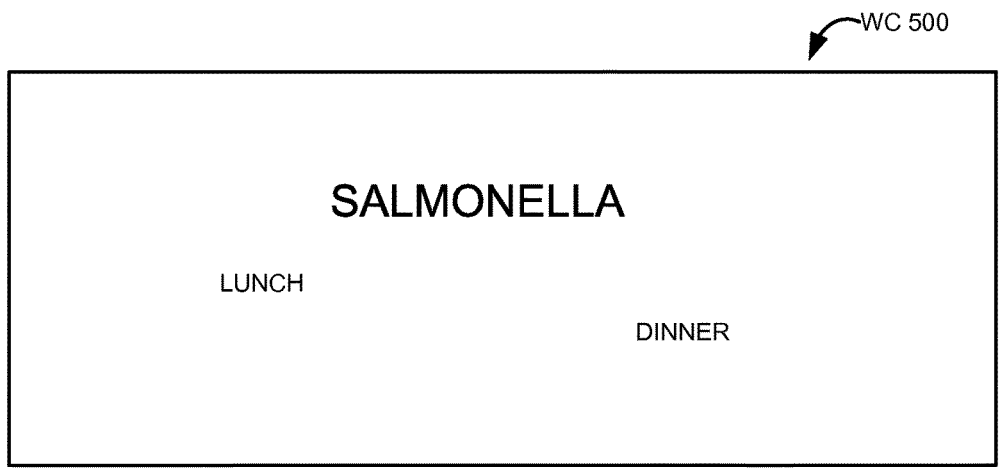
FIGS. 5A-5B represent Word Cloud visualizations, of the results of a Periodic Analysis as applied to a Stage 1 analysis.
Figure 5B:

For presentation to the user, any visualization discussed above, with regard to the results of Stage 1, can be used to visualize the result of applying Periodic Analysis. FIGS. 5A-5B are the same as the Word Clouds of FIGS. 3A-3B, except the n-grams are displayed in accordance with the results of the Periodic Analysis. Word Cloud 500 of FIG. 5A is the same as Word Cloud 300 of FIG. 3A, except that the n-gram "lunch" is reduced to a minimum-sized font (like the n-gram "dinner"). Word Cloud 501 of FIG. 5B is the same as Word Cloud 301 of FIG. 3B, except that the n-gram "lunch" is reduced to a minimum-transparency font (like the n-gram "dinner").

The Word Clouds of FIGS. 5A-5B are, compared to the Word Clouds of FIGS. 3A-3B, more helpful to brand manager bm_1. Word Clouds 500 and 501 should allow bm_1 to recognize faster and easier, that "*salmonella*" is an extremely important new topic of conversation.

3 ADDITIONAL INFORMATION

3.1 Referring To Related Applications

In addition to being incorporated by reference in their entirety, the description presented herein specifically relies on many sections of the Related Applications. A specific Related Application can be referred to as "the '123 Application," where '123 is the last three digits of the Application Number of a Related Application. A specific section of a Related Application can also be referenced herein by using any of the following conventions:
Section X, '123
Section X, '123 ("Title")
Section X, '123, "Title"
Where:
'123 is the last three digits of the Application Number of the Related Application being referenced;
"X" is the number of a section, as it is numbered within an Application '123; and
"Title" is the title of the section referenced (optional).

3.2 Additional Calculations

Let us assume that, upon sampling the same hour of 10:01 AM-11:00 AM, on the five Wednesdays that preceded the TPI, the following data is collected for the n-gram "*salmonella*" with respect to the brand FastEats:
1, 0, 1, 1, 0
ng_avg_$s_{REF}$ for this data is:

$$ng\_avg\_s_{REF} = 3/5 = 0.6$$

From ng_no$_{TPI}$ can be subtracted ng_avg_$s_{REF}$, to produce a non-normalized difference value:

$$ng\_diff\_s = 8 - 0.6 = 7.4$$

Dividing this ng_diff_s by ng_avg_$s_{REF}$ or ng_no$_{TPI}$, and multiplying by 100, to determine a normalized difference value as a % (called ng_dn_s %), shows little change from the ng_dn % determined in Stage 1:

$$ng\_dn\% = 1180\%$$

$$ng\_dn\_s \% = 1233\%$$

Alternatively, the standard deviation (called ng_sd_s) can be determined, of the sampled data:

| # occur "lunch" at 11 am for different Wed | ng_avg_$s_{REF}$ | # occur − ng_avg_$s_{REF}$ | ( # occur − ng_avg_$s_{REF}$)$^2$ |
|---|---|---|---|
| 1 | 0.6 | 0.4  | 0.16 |
| 0 | 0.6 | −0.6 | 0.36 |
| 1 | 0.6 | 0.4  | 0.16 |
| 1 | 0.6 | 0.4  | 0.16 |
| 0 | 0.6 | −0.6 | 0.36 |
|   |     |      | 1.2  |

$ng\_sd\_s = \sqrt{1.2/5} = 0.49$

Dividing ng_diff_s by ng_sd_s produces the following value for ng_dn_s:

$7.4/0.49 = 15.1$

Let us assume that, upon sampling the same hour of 10:01 AM-11:00 AM, on the five Wednesdays that preceded the TPI, the following data is collected for the n-gram "dinner" with respect to the brand FastEats:

23, 25, 30, 27, 20

$ng\_avg\_s_{REF}$ for this data is:

$ng\_avg\_s_{REF} = 125/5 = 25.0$

From $ng\_no_{TPI}$ can be subtracted $ng\_avg\_s_{REF}$, to produce a non-normalized difference value:

$ng\_diff\_s = 27 - 25 = 2.0$

Dividing this ng_diff_s by $ng\_avg\_s_{REF}$ or $ng\_no_{TPI}$, and multiplying by 100, to determine a normalized difference value as a % (called ng_dn_s %), shows no change from the ng_dn % determined in Stage 1:

$ng\_dn\ \% = 8\%$ $ng\_dn\_s\ \% = 8\%$

Alternatively, the standard deviation (called ng_sd_s) can be determined, of the sampled data:

| # occur "lunch" at 11 am for different Wed | $ng\_avg\_s_{REF}$ | # occur − $ng\_avg\_s_{REF}$ | (# occur − $ng\_avg\_s_{REF})^2$ |
|---|---|---|---|
| 23 | 25 | −2.0 | 4.0 |
| 25 | 25 | 0 | 0.0 |
| 30 | 25 | 5.0 | 25.0 |
| 27 | 25 | 2.0 | 4.0 |
| 20 | 25 | −5.0 | 25.0 |
| | | | 58.0 |

$ng\_sd\_s = \sqrt{58/5} = 3.4$

Dividing ng_diff_s by ng_sd_s produces the following value for ng_dn_s:

$2.0/3.4 = 0.59$

3.3 Frame-Based Search Engines (or FBSE's)

Section 4, '837 ("FBSE") describes a Frame-Based Search Engine (or FBSE). This FBSE is a more generic form of the kind of search described herein in Section 1.2, '417 ("Consumer Sentiment Search").

Section 4.2, '837 discusses frames as a form of concept representation (Section 4.2.1) and the use of frame extraction rules to produce instances of frames (Section 4.2.2). A pseudo-code format for frame extraction rules is presented in Section 6.2, '837 ("Frame Extraction Rules").

Snippets are discussed in Section 6.4, '837.

Parts of the '837 Application are repeated, in this section, for convenience to the reader.

In general, a frame is a structure for representing a concept, wherein such concept is also referred to herein as a "frame concept." A frame specifies a concept in terms of a set of "roles." Any type of concept can be represented by a frame, as long as the concept can be meaningfully decomposed (or modeled), for the particular application, by a set of roles.

When a frame concept is detected, for a particular UNL (see below Glossary of Selected Terms for definition) in a corpus of natural language, a frame "instance" is created. The instance has, for each applicable frame role, a "role value" assigned. A role value represents a particular, of how the frame concept is being used, by the UNL where frame concept is detected.

Detection, of whether a frame concept is applicable, can be determined by a set of linguistic rules, each rule herein called a "frame extraction rule." A set of frame extraction rules, that all relate to a particular frame, can be called the frame's "Rule Set." Ideally, a frame's Rule Set is able to detect whenever the frame's frame concept is being used, and thereby produce a frame instance representing each particular use of the frame concept. "Frame extraction," as used herein, refers to the utilization of a frame extraction rule to determine whether a frame is invoked by a UNL.

If a large corpus of interest (or "C_of_I") is to be searched, such as a significant portion of the online information available on the Internet, in order to have a practical Frame-Based Search Engine (or FBSE) it is typically necessary to perform a large amount of pre-query scanning and indexing of the C_of_I. An overview of this process is discussed at Section 4.1, '837 and Section 4.3.2.1, '837. The basic steps, of an FBSE, are:

1. Instance Generation: Includes pre-query, large-scale, application of a frame of interest. The database produced, by such large-scale frame application, can be called a "Frame-Based DataBase" (FBDB), with the frame (or frames) applied called the "Organizing Frame." The FBDB produced is typically an Inverted Index Database (or IIDB). However produced, the FBDB is searched according to the user's query and an initial set of result instances (called the "instance superset") is produced.

2. Instance Merging: Merges together instances of the instance superset. Merging is typically done because, from the perspective of a user, seemingly independent instances are more efficiently reviewed as part of a same instance "x." If a merge is deemed appropriate, the previously independent instances can be re-classified as just different "instance-mentions." The result of merging can be referred to as the "merged superset."

3. Instance Selection: Selects instances from a set of instances (such as the merged superset), for inclusion in a search result, according to the criteria of a user's query.

The above-described steps can be accomplished using, for example, the computing environment described in Section 3.4. Regarding ordering of the steps, Instance Generation is performed before the steps of Instance Merging or Instance Selection. Instance Merging and Instance Selection, however, can be performed in either order (or even concurrently), depending upon the particular application.

3.4 Computing Environment

Figure 6:
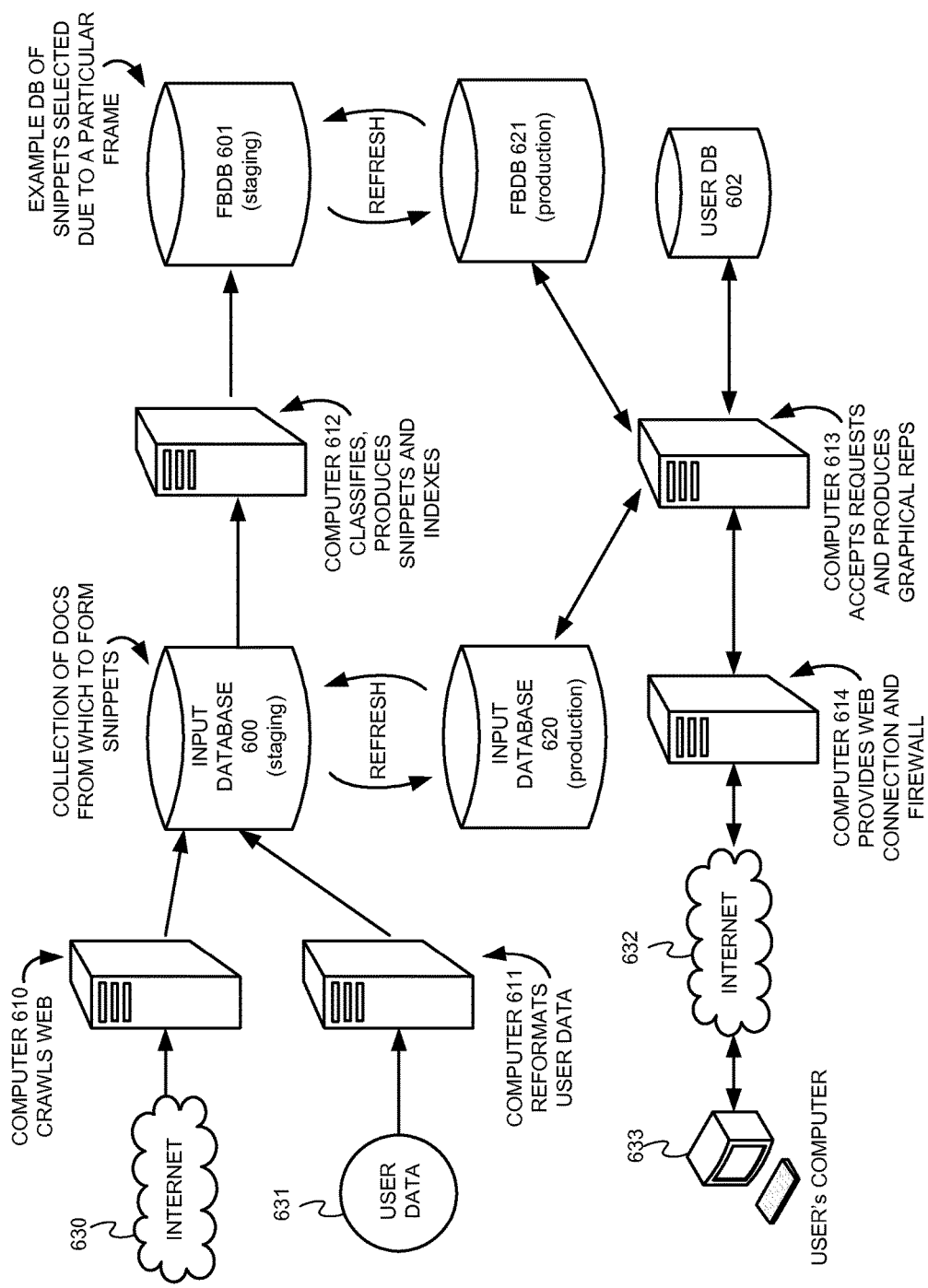
FIG. 6 depicts an example production-level computer system design in which the techniques described herein can be applied.

FIG. 6 depicts an example production-level computer system design in which the techniques described herein can be applied.

Cloud 630 represents data, such as online opinion data, available via the Internet. Computer 610 can execute a web crawling program, such as Heritrix, that finds appropriate web pages and collects them in an input database 600. An alternative, or additional, route for collecting input database 600 is to use user-supplied data 631. For example, such user-supplied data 631 can include the following: any nonvolatile media (e.g., a hard drive, CD-ROM or DVD), record-oriented databases (relational or otherwise), an Intranet or a document repository. A computer 611 can be used to process (e.g., reformat) such user-supplied data 631 for input database 600.

Computer 612 can perform the indexing needed for formation of an appropriate frame-based database (FBDB). FBDB's are discussed above (Section 3.3 "Frame-Based Search Engines (or FBSE's)") and in the Related Applications. The indexing phase scans the input database for sentences that refer to an organizing frame (such as the "Sentiment" frame), produces a snippet around each such sentence and adds the snippet to the appropriate frame-based database. FIG. 6 depicts an example FBDB 601. For the example frame-based search systems described in Section 1.1, '417 and Section 1.2, '417, an FBDB based on the "Sentiment" frame could be produced.

Databases 620 and 621 represent, respectively, stable "snapshots" of databases 600 and 601. Databases 620 and 621 can provide stable databases that are available for searching, about an object of interest in a first corpus, in response to queries entered by a user at computer 633. Such user queries can travel over the Internet (indicated by cloud 632) to a web interfacing computer 614 that can also run a firewall program. Computer 613 can receive the user query, collect snippet and frame instance data from the contents of the appropriate FBDB (e.g., FBDB 621), and transmit the results back to computer 633 for display to the user. The results from computer 613 can also be stored in a database 602 that is private to the individual user. When it is desired to see the snippets, on which a graphical representation is based, FBDB 621 is available. If it is further desired to see the full documents, on which snippets are based, input database 620 is also available to the user.

In accordance with what is ordinarily known by those in the art, computers 610, 611, 612, 613, 614 and 633 contain computational hardware (e.g., integrated circuits), and programmable memories (volatile and/or non-volatile), of various types.

The kind of information described herein (such as data and/or instructions), that is on computer-readable media and/or programmable memories, can be stored on computer-readable code devices embodied therein. A computer-readable code device can represent that portion of a memory in which a defined unit of information (such as a bit) can be stored and/or from which a defined unit of information can be retrieved.

4 GLOSSARY OF SELECTED TERMS corpora time-series (also referred to herein as a time-series of corpora): each of its corpora is collected in essentially the same way, except for the following: each corpus of the time-series represents data that is linked to a different (and often successive) time interval.

Lexical unit: A sequence of one or more words that has at least one meaning "m" for which the sequence operates as an indivisible unit. Meaning "m" cannot be derived from the sequence through any normal composition of the meanings of the sequence's constituent words. For example, "The White House" is not simply any house which happens to be white, and "dry ice" is not simply ice that happens to be dry.

UNL: Refers to a "unit of natural language" in a corpus of human language. The term "UNL" can be used to refer to any unit of a natural language. For example, a UNL can refer to a unit that is of arbitrary length or that is not associated with any general linguistic structure. However, the UNL focused upon herein is the single sentence or clause.

While the invention has been described in conjunction with specific embodiments, such as the tracking of a brand by a brand manager, it is evident that many alternatives, modifications and variations will be apparent in light of the foregoing description. For example, the invention can be used to track any kind of statement (not just opinions) regarding any kind of object (not just brands) as made by any group of relevant persons (not just consumers). Accordingly, the invention is intended to embrace all such alternatives, modifications and variations, as well as those equivalents that fall within the spirit and scope of this description and its appended claims.

What is claimed is:

1. A method for identifying n-grams about an object, comprising:

identifying, as a result of computing hardware and programmable memory, an object-specific corpus, that is a subset of a first corpus, where approximately all statements of the object-specific corpus are about a same first object;

identifying, as a result of computing hardware and programmable memory, statements of the object-specific corpus, for inclusion in a corpus of interest, upon a basis of a statement relating to a time period of interest;

identifying, as a result of computing hardware and programmable memory, statements of the object-specific corpus, for inclusion in a reference corpus, upon a basis of a statement relating to a reference time period that is different from the time period of interest;

identifying for a selected list of n-grams, as a result of computing hardware and programmable memory, n-grams that appear in both the corpus of interest and the reference corpus;

identifying, as a result of computing hardware and programmable memory, for each n-gram of the selected list of n-grams, for subsequent access in conjunction with an n-gram, a number of occurrences of the n-gram in the corpus of interest;

identifying, as a result of computing hardware and programmable memory, for each n-gram of the selected list of n-grams, for subsequent access in conjunction with an n-gram, a number of occurrences of the n-gram in the reference corpus;

determining, as a result of computing hardware and programmable memory, for each n-gram of the selected list of n-grams, for subsequent access in conjunction with an n-gram, an average number of occurrences of the n-gram, in the reference-corpus;

determining, as a result of computing hardware and programmable memory, for each n-gram of the selected list of n-grams, for subsequent access in conjunction with an n-gram, a difference value, between a number of occurrences of the n-gram in the corpus of interest and an average number of occurrences of the n-gram in the reference-corpus;

normalizing, as a result of computing hardware and programmable memory, for each n-gram of the selected list of n-grams, for subsequent access in conjunction with an n-gram, the difference value to produce a normalized difference value; and determining, as a result of computing hardware and programmable memory, from the selected list of n-grams, a second selected list of n-grams, on a basis of the normalized difference value; and displaying, as a result of computing hardware and programmable memory, n-grams of the second selected list to the user with a visualization technique.

2. The method of claim 1, wherein a duration of the reference time period is equal to an integer times a duration of the time period of interest.

3. The method of claim 1, wherein the step of determining a selected list of n-grams further comprises:
determining an n-gram, for inclusion in the selected list of n-grams, on a basis of a number of occurrences of the n-gram in the object-specific corpus.

4. The method of claim 1, wherein the step of determining an average number of occurrences of an n-gram further comprises:
determining a first multiple that, when a time duration of the corpus of interest is multiplied by, produces a time duration represented by the reference corpus; and
using the first multiple to determine an average number of occurrences of an n-gram in the reference-corpus.

5. The method of claim 4, wherein the step of using the first multiple further comprises:
dividing, for each n-gram of the selected list of n-grams, a number of occurrences of the n-gram in the reference corpus by the multiple.

6. The method of claim 1, wherein the step of normalizing, to produce a normalized difference value, further comprises:
dividing, for each n-gram of the selected list of n-grams, a difference value by an average number of occurrences of the n-gram in the reference-corpus.

7. The method of claim 1, wherein the step of normalizing, to produce a normalized difference value, further comprises:
dividing, for each n-gram of the selected list of n-grams, a difference value by a number of occurrences of the n-gram in the corpus of interest.

8. The method of claim 1, wherein the step of normalizing, to produce a normalized difference value, further comprises:
dividing, for each n-gram of the selected list of n-grams, a difference value by a standard deviation of occurrences of the n-gram in the reference-corpus.

9. The method of claim 1, wherein the step of determining a second selected list of n-grams further comprises:
ordering the selected list of n-grams on a basis of decreasing normalized difference value; and
selecting a first predetermined number of n-grams from the ordered selected list of n-grams.

10. The method of claim 1, further comprising:
varying a first graphical dimension or characteristic, for a display of each n-gram of the second selected list of n-grams, on a basis of the normalized difference value of the n-gram.

11. The method of claim 10, wherein the first graphical dimension is a font size, for a display of each n-gram of the second selected list of n-grams.

12. The method of claim 10, further comprising:
varying a second graphical dimension or characteristic, for a display of each n-gram of the second selected list of n-grams, on a basis of a number of occurrences of the n-gram.

13. The method of claim 1, further comprising:
producing a first Logical Form semantic representation for a first unit of natural language of the first corpus;
determining whether a first frame extraction rule matches the first Logical Form;
producing, if the first frame extraction rule matches, a first instance having at least object and sentiment roles, with values of the first Logical Form assigned to corresponding roles of the first instance; and
including the first instance in the first object-specific corpus if the user entered query matches a value assigned to the object role of the first instance.

14. The method of claim 12, wherein the first graphical characteristic is a font transparency and the second graphical dimension is a font size, for a display of each n-gram of the second selected list of n-grams.

15. The method of claim 1, further comprising:
selecting a sample period;
producing a plurality of reference corpora, wherein a begin time, for each sub-corpus of the plurality of reference corpora, differs, from a begin time for the corpus of interest, by an integer multiple of the sample period;
identifying, for each n-gram of the second selected list of n-grams and for each sub-corpus of the plurality of reference corpora, for subsequent access in conjunction with an n-gram, a number of occurrences of the n-gram in the sub-corpus;
determining, for each n-gram of the second selected list of n-grams, for subsequent access in conjunction with an n-gram, a second average number of occurrences of the n-gram, from a number of occurrences of the n-gram in each sub-corpus;
determining, for each n-gram of the second selected list of n-grams, for subsequent access in conjunction with an n-gram, a second difference value, between a number of occurrences of the n-gram in the corpus of interest and a second average number of occurrences of the n-gram;
normalizing, for each n-gram of the second selected list of n-grams, for subsequent access in conjunction with an n-gram, the second difference value to produce a second normalized difference value; and
determining, from the second selected list of n-grams, a third selected list of n-grams, on a basis of the second normalized difference value.

16. The method of claim 15, wherein the step of normalizing, to produce a second normalized difference value, further comprises:
determining, for each n-gram of the second selected list of n-grams, a standard deviation from a number of occurrences of the n-gram in each sub-corpus;
dividing, for each n-gram of the second selected list of n-grams, a second difference value by a standard deviation.

17. The method of claim 15, further comprising:
varying a first graphical dimension or characteristic, for a display of each n-gram of the third selected list of n-grams, on a basis of the second normalized difference value of the n-gram.

18. The method of claim 17, wherein the first graphical dimension is a font size, for a display of each n-gram of the second selected list of n-grams.

19. The method of claim 17, further comprising:
varying a second graphical dimension or characteristic, for a display of each n-gram of the second selected list of n-grams, on a basis of a number of occurrences of the n-gram.

20. The method of claim 19, wherein the first graphical characteristic is a font transparency and the second graphical dimension is a font size, for a display of each n-gram of the second selected list of n-grams.

* * * * *